(12) United States Patent
Stanhope et al.

(10) Patent No.: US 12,336,444 B2
(45) Date of Patent: Jun. 24, 2025

(54) RESIDUE MANAGER ADJUSTMENT SYSTEM AND METHOD

(71) Applicant: CNH Industrial America LLC, New Holland, PA (US)

(72) Inventors: Trevor Stanhope, Oak Lawn, IL (US); Michael Christopher Conboy, Chicago, IL (US)

( * ) Notice: Subject to any disclaimer, the term of this patent is extended or adjusted under 35 U.S.C. 154(b) by 377 days.

(21) Appl. No.: 17/828,821

(22) Filed: May 31, 2022

(65) Prior Publication Data

US 2023/0380317 A1 Nov. 30, 2023

(51) Int. Cl.
*A01B 33/08* (2006.01)
*A01B 63/28* (2006.01)
*A01B 79/02* (2006.01)

(52) U.S. Cl.
CPC ............ *A01B 33/087* (2013.01); *A01B 63/28* (2013.01); *A01B 79/02* (2013.01)

(58) Field of Classification Search
CPC ....... A01B 33/087; A01B 63/28; A01B 79/02; A01C 5/062; A01C 7/203
See application file for complete search history.

(56) References Cited

U.S. PATENT DOCUMENTS

| | | | |
|---|---|---|---|
| 9,173,339 B2 | 11/2015 | Sauder et al. | |
| 9,675,004 B2 | 6/2017 | Landphair et al. | |
| 9,801,332 B2 | 10/2017 | Landphair et al. | |
| 10,512,212 B2 | 12/2019 | Koch et al. | |
| 10,609,857 B2 | 4/2020 | Sauder et al. | |
| 10,986,766 B2 | 4/2021 | Antich | |
| 11,122,731 B2 | 9/2021 | Hubner et al. | |
| 11,147,204 B2 | 10/2021 | Stanhope et al. | |
| 2003/0016029 A1 | 1/2003 | Schuler et al. | |
| 2009/0173147 A1* | 7/2009 | Sandomirsky | .......... E02D 1/022 73/84 |
| 2014/0343800 A1* | 11/2014 | Nelson | .................... E02F 3/845 701/49 |

(Continued)

OTHER PUBLICATIONS

Dietz, "Variable-Depth Planting Controller Coming," Successful Farming, Jan. 25, 2016, (1 page) https://www.agriculture.com/machinery/planting/the-latest-planter-technology-delivers-optimal-seed-placement.

(Continued)

*Primary Examiner* — Hunter B Lonsberry
*Assistant Examiner* — Jalal C Coduroglu
(74) *Attorney, Agent, or Firm* — Rebecca Henkel; Peter K. Zacharias; Rickard K. DeMille (57) ABSTRACT

A system for a row unit of a planting implement includes a frame operably coupled with a toolbar. One or more ground-engaging tools can be operably coupled with the frame. A depth adjustment system includes one or more actuators and a sensor system configured to capture data indicative of a soil characteristic. A computing system is communicatively coupled to the one or more actuators and the sensor system. The computing system is configured to receive the data indicative of the soil characteristic, determine a probability of a penetration variation of the one or more ground-engaging tools relative to a respective depth range for each of the one or more ground-engaging tools, and perform a control action based at least in part on the probability deviating from a defined threshold.

19 Claims, 5 Drawing Sheets

(56) References Cited

U.S. PATENT DOCUMENTS

| | | | | |
|---|---|---|---|---|
| 2017/0086349 | A1* | 3/2017 | Tevs | A01C 7/203 |
| 2017/0094889 | A1* | 4/2017 | Garner | A01C 7/206 |
| 2018/0243774 | A1* | 8/2018 | Davis | B05B 9/06 |
| 2019/0075714 | A1* | 3/2019 | Koch | A01B 63/32 |
| 2019/0254223 | A1* | 8/2019 | Eichhorn | A01B 63/16 |
| 2019/0307057 | A1* | 10/2019 | Sauder | A01C 21/005 |
| 2020/0045869 | A1* | 2/2020 | Stanhope | A01C 7/205 |
| 2020/0060068 | A1* | 2/2020 | Stanhope | A01C 7/205 |
| 2020/0113126 | A1* | 4/2020 | Eising | A01C 21/007 |
| 2020/0156470 | A1* | 5/2020 | Stanhope | A01B 79/02 |
| 2020/0344939 | A1* | 11/2020 | Sporrer | A01B 33/16 |
| 2020/0375081 | A1 | 12/2020 | Holoubek | |
| 2021/0169023 | A1* | 6/2021 | Haran | G01S 13/867 |
| 2022/0232763 | A1* | 7/2022 | Palla | G05D 1/0278 |
| 2022/0361391 | A1* | 11/2022 | Sloneker | A01B 63/008 |
| 2022/0377967 | A1* | 12/2022 | Thompson | A01C 7/203 |
| 2023/0232734 | A1* | 7/2023 | Morse | A01M 17/00 |
| | | | | 111/163 |

OTHER PUBLICATIONS

Sharda et al., "Planter Downforce Technology for Uniform Seeding Depth," K-State Research and Extension, Biological and Agricultural Engineering, Kansas State University, Mar. 2017, (8 pages) https://bookstore.ksre.ksu.edu/pubs/mf3331.pdf.

* cited by examiner

RESIDUE MANAGER ADJUSTMENT SYSTEM AND METHOD

FIELD

The present disclosure generally relates to planting implements and, more particularly, to a row unit for a planting implement that can include a depth adjustment system.

BACKGROUND

Planting implements may be employed to deposit an agricultural product, such as a seed, fertilizer, pesticide, and other chemicals and materials, into soil. In some cases, the planting implements can include one or more furrow-forming tools or openers that excavate a furrow or trench in the soil. One or more dispensing devices of the planting implements may, in turn, deposit the agricultural product into the furrow. After deposition of the agricultural product, a closing assembly may close the furrow in the soil, such as by pushing the excavated soil into the furrow.

In some instances, the implement may include an assembly to set a downforce of the row unit, which, in turn, can determine a depth at which the agricultural product is deposited into the soil. While such assemblies can work well, an improved depth adjustment system for a planting implement would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for a row unit of a planting implement. The system includes a frame operably coupled with a toolbar and one or more ground-engaging tools operably coupled with the frame. A depth adjustment system includes an actuator and a sensor system configured to capture data indicative of a soil characteristic. A computing system is communicatively coupled to the one or more actuators and the sensor system. The computing system is configured to receive the data indicative of the soil characteristic, determine a probability of a penetration variation of the one or more ground-engaging tools relative to a respective depth range for each of the one or more ground-engaging tools, and perform a control action based at least in part on the probability deviating from a defined threshold.

In some aspects, the present subject matter is directed to a method for an agricultural operation. The method includes receiving, from a sensor system, data indicative of a first soil characteristic. The method also includes determining, with a computing system, a first probability of a first penetration variation of a first ground-engaging tool relative to a respective depth range for the first ground-engaging tool based at least partially on the first soil characteristic.

In some aspects, the present subject matter is directed to a system for a row unit of a planting implement. The system includes a frame operably coupled with a toolbar and a ground-engaging tool operably coupled with the frame. An actuator is operably coupled with the frame and the ground-engaging tool. A sensor system is configured to capture data indicative of a first height of an on-row path relative to the frame and a second height of an off-set path relative to the frame. A computing system is communicatively coupled to the actuator and the sensor system. The computing system is configured to receive the data indicative of the first height and the second height, determine a detected depth of the ground-engaging tool based on a difference between the first height and the second height, compare the detected depth to a defined depth range, and activate the actuator to alter a first position of the ground-engaging tool to a second position of the ground-engaging tool when the detected depth deviates from the defined depth range.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a material within a fluid circuit. For example, "upstream" refers to the direction from which a material flows, and "downstream" refers to the direction to which the material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for a row unit of a planting implement. The system can include a frame that is operably coupled with a toolbar of an implement. Each row unit may be configured to form a furrow having a predefined depth within the soil of a field. Thereafter, each row unit may deposit an agricultural product, such as seeds, fertilizers, pesticides, and other chemicals and materials, within the corresponding furrow and subsequently close the corresponding furrow after the agricultural product has been deposited. To this end, the row unit can include one or more ground-engaging tools to perform the various functions. The one or more ground-engaging tools may be operably coupled with the frame.

The system may further include a depth adjustment system that includes one or more actuators. The one or more actuators can be operably coupled with the frame and one or more ground-engaging tools. For instance, a first actuator may be operably coupled with a first ground-engaging tool and the frame, a second actuator may be operably coupled with a second ground-engaging tool and the frame, and so on.

The depth adjustment system may further include a sensor system. The sensor system can be capture data indicative of a soil characteristic, such as a soil moisture content (i.e., a percent by volume of water within the soil). Additionally or alternatively, the sensor system may be configured to capture data indicative of a first height of an on-row path relative to the frame and a second height of an off-set path relative to the frame.

A computing system can be communicatively coupled to the one or more actuators and the sensor system. The computing system can be configured to determine a probability of a penetration variation of a ground-engaging tool relative to a respective defined depth range based on the soil characteristic. In some instances, the probability of a penetration variation of the ground-engaging tool relative to the respective depth range may be based on the soil characteristic may be determined based on the detected soil characteristics. Additionally or alternatively, the probability of a penetration variation of the ground-engaging tool relative to the respective depth range may be based on a difference between the detected height of the row unit, as calculated based on the first height and the second height, and the defined depth range.

In some instances, the computing system may activate one or more of the actuators to alter a first position of a ground-engaging tool to a second position of the ground-engaging tool when the probability of variation exceeds a defined threshold and/or the detected depth deviates from the defined depth range. In some cases, the second position can be at least partially based on the probability of a penetration variation and/or the difference between the detected height of the row unit, as calculated based on the first height and the second height, and the defined depth range.

Figure 1:
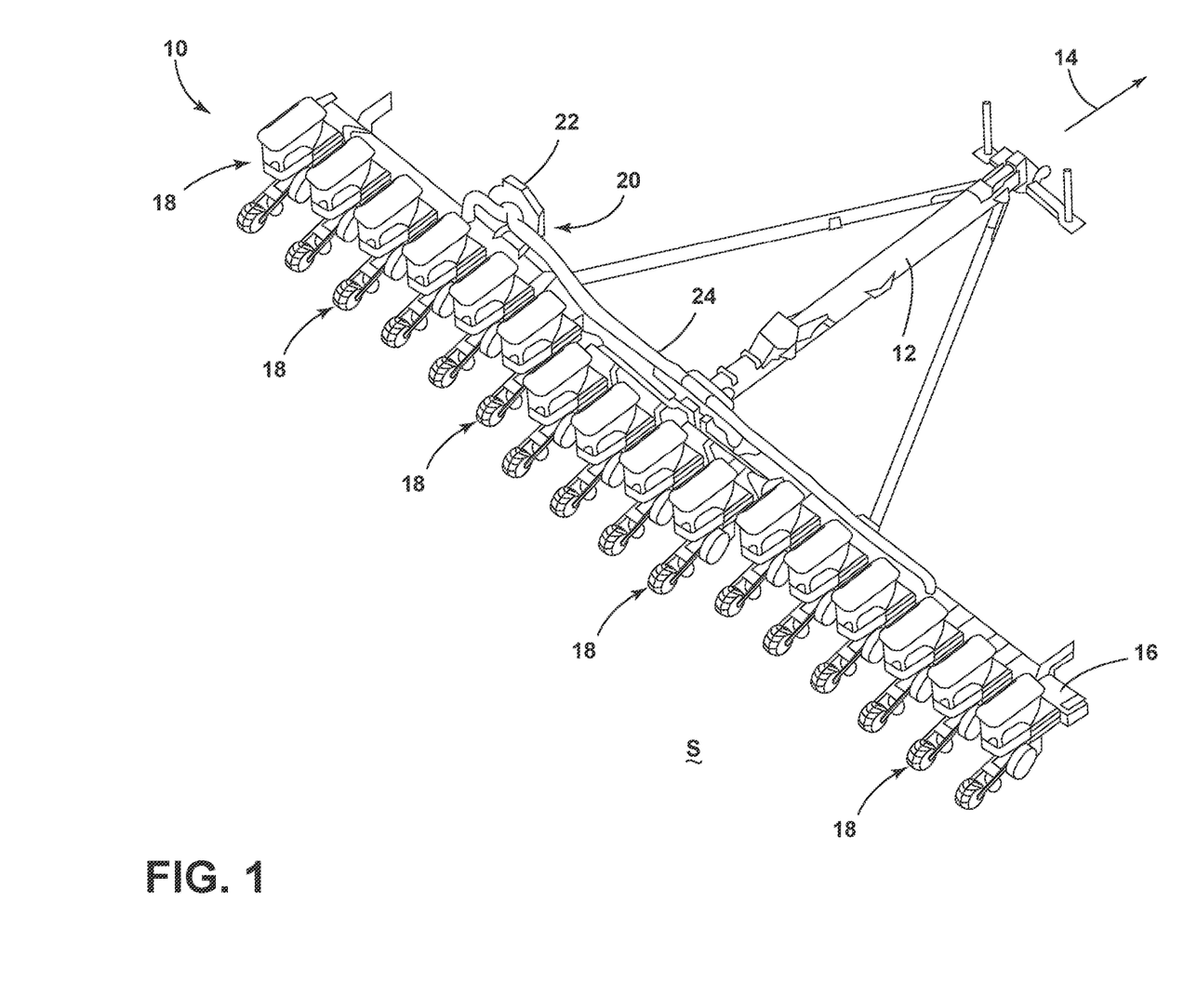
FIG. 1 illustrates a perspective view of a planting implement in accordance with aspects of the present subject matter.

Referring now to the drawings, FIG. 1 illustrates a perspective view of a planting implement 10 in accordance with aspects of the present subject matter. In the illustrated example, the planting implement 10 is configured as a planter. However, in alternative embodiments, the planting implement 10 may generally correspond to any suitable seed-planting equipment or implement, such as a seeder or any other product-dispensing implement.

As shown in FIG. 1, the planting implement 10 can include a tow bar 12. In general, the tow bar 12 may be configured to couple to an agricultural vehicle, such as a tractor, via a suitable hitch assembly. In this respect, the vehicle may tow the planting implement 10 across a field in a direction of travel (indicated by arrow 14) to perform a planting operation or other operation on the field.

Furthermore, the planting implement 10 can include a toolbar 16 coupled to the tow bar 12. The toolbar 16 may be configured to support and/or couple to one or more components of the planting implement 10. In some examples, the toolbar 16 may be configured to support a plurality of seed-planting units or row units 18. Each row unit 18 may be configured to form a furrow having a predefined depth within the soil S of a field. Thereafter, each row unit 18 may deposit an agricultural product, such as seeds, fertilizers, pesticides, and other chemicals and materials, within the corresponding furrow and subsequently close the corresponding furrow after the agricultural product has been deposited. In general, the planting implement 10 may include any number of row units 18. For example, in the illustrated example, the planting implement 10 includes sixteen row units 18 coupled to the toolbar 16. However, in other embodiments, the planting implement 10 may include six, eight, twelve, twenty-four, thirty-two, thirty-six, or any other number of row units 18.

Additionally, in some examples, the planting implement 10 can include a pneumatic distribution system 20. In general, the pneumatic distribution system 20 is configured to distribute seeds from a bulk storage tank to the individual row units 18. As such, the pneumatic distribution system 20 may include a fan 22 or other pressurized air source and a plurality of seed conduits 24 extending between the fan 22 and the row units 18. In this respect, the pressurized air generated by the fan 22 conveys the seeds from the bulk storage tank through the seed conduits 24 to the individual row units 18. However, the seeds may be provided to the row units 18 in any other suitable manner.

It will be further appreciated that the configuration of the planting implement 10 described above and shown in FIG. 1 is provided only to place the present subject matter in an exemplary field of use. Thus, it will be appreciated that the present subject matter may be readily adaptable to any agricultural implement configuration.

Figure 2:
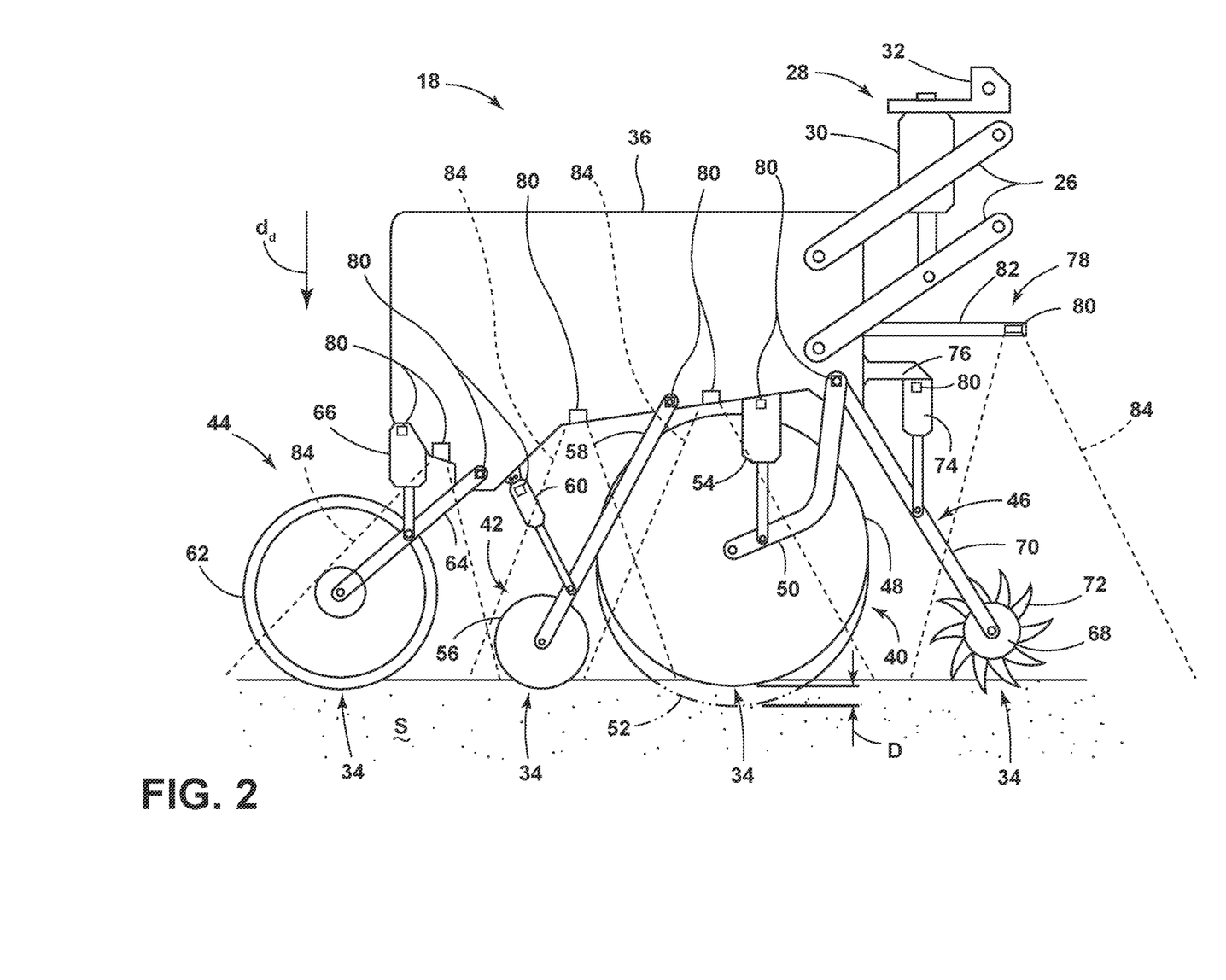
FIG. 2 illustrates a perspective view of a row unit for a planting implement in accordance with aspects of the present subject matter.
Figure 3:
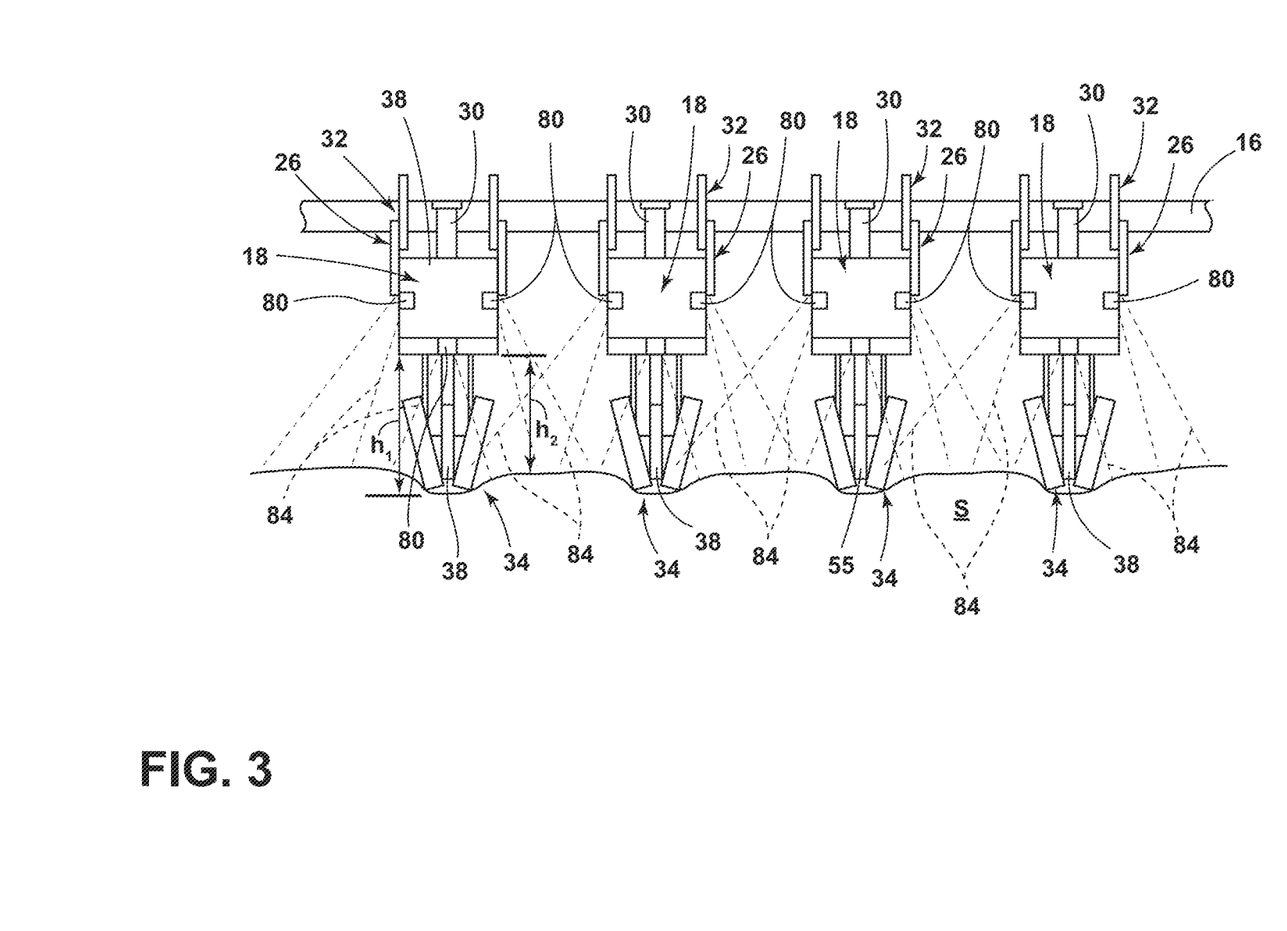
FIG. 3 illustrates a front view of a plurality of row units of a planting implement in accordance with aspects of the present subject matter.

Referring now to FIGS. 2 and 3, the row unit 18 can include a linkage assembly 26, which may be a four-bar linkage, configured to couple the row unit 18 to the toolbar 16, while enabling vertical movement of the row unit 18 relative to the toolbar 16.

In various examples, the movement of the row unit 18 may be accomplished through a depth adjustment system 28. In some cases, the depth adjustment system 28 can include a row unit actuator 30 that can extend between a mounting bracket 32 and a lower portion of the parallel linkage assembly 26 to establish a contact force between the row unit 18 and the soil S. The row unit actuator 30 is configured to apply a force to the row unit 18 in a downward direction $d_d$ relative to the toolbar 16, thereby driving one or more ground-engaging tools 34 into the soil S. As will be appreciated, a desired level of down force may vary based on soil type, the degree of tillage applied to the soil S, soil moisture content (i.e., percent water by volume of soil makeup), amount of residue cover, and/or tool wear, among other factors. Because such factors may vary from one side of the implement 10 to the other, a different level of down force may be selected for each row unit 18.

Furthermore, a desired level of down force may be at least partially dependent on the speed at which the row unit 18 is pulled across the field. For example, as speed increases, the ground-engaging tools 34 may have a tendency to rise out of the ground due to the interaction between the soil S and the implement 10. Consequently, a greater down force may be applied during higher speed operation to ensure that the ground-engaging tools 34 remain at a desired depth. In addition, the weight of the row unit 18 applies a force to the ground-engaging tools 34 in the downward direction $d_d$. However, as seeds and/or other products are transferred from a storage container within the row unit 18 to the soil S, the weight of the row unit 18 decreases. Therefore, the row unit actuator 30 may apply a greater force to the row unit 18 to compensate. In some examples, the row unit actuator 30 may be implemented within a system 100 (FIG. 3) configured to automatically regulate the pressure within the row unit actuator 30 to maintain a desired contact force between the ground-engaging tools 34 and the soil S. Because each row unit 18 can include an independent row unit actuator 30, the contact force may vary across the implement 10.

In various examples, the linkage assembly 26 can be pivotally coupled to a frame 36. The frame 36 may be configured to support various elements of the row unit 18, such as a metering system and a product storage container, for example. As illustrated, the frame 36 can further support an opener assembly 40, a soil closing assembly 42, a press assembly 44, and a residue manager assembly 46, each of which may include one or more ground-engaging tools 34.

In the illustrated configuration, the opener assembly 40 can include a ground-engaging tool 34 in the form of a gauge wheel assembly having a gauge wheel 48 and a rotatable arm 50, which can function to movably couple the gauge wheel 48 to the frame 36. The gauge wheel 48 may be positioned a vertical distance D above an opener disk 52 to establish a desired trench depth for seed deposition into the soil S. As the row unit 18 travels across a field, the opener disk 52 excavates a trench into the soil S, and seeds are deposited into the trench.

In some examples, the depth adjustment system 28 may include an opener control actuator 54 extending between the frame 36 and the rotatable arm 50 of the opener assembly 40. The opener control actuator 54 is configured to adjust the penetration depth D of the opener disk 52 by varying a position of the gauge wheel 48 relative to the frame 36. While one opener assembly 40 is illustrated in the present examples, it will be appreciated that alternative examples may include a pair of opener assemblies 40 positioned on opposite side portions of the frame 36. In such configurations, the opener disks 52 may be angled toward one another to establish a wider trench within the soil S.

In various instances, seeds may be deposited within the excavated trench via a seed tube 38 extending between a metering system within the frame 36 and the soil S. The seed tube 38 exit may be positioned aft of the opener assembly 40 and forward of the closing assembly 42 such that seeds flow into the trench.

The closing assembly 42 may include one or more ground-engaging tools 34 in the form of a closing disk 56 that can push the excavated soil into the trench, thereby closing the trench. As illustrated, the closing assembly 42 can include an arm 58 extending between the frame 36 and the closing disk 56.

The depth adjustment system 28 may include a closing disk actuator 60 that can be operably coupled to the arm 58 of the closing assembly 42 and configured to regulate a contact force between the closing disk 56 and the soil S. For example, a large contact force may be applied to effectively push dense soil into the trench, while a relatively small contact force may be applied to close a trench within loose soil. While one closing disk 56 is shown in the illustrated example, a pair of disks 56 may be provided without departing from the teachings provided herein. Additionally or alternatively, various examples may employ closing wheels or any other device instead of the illustrated closing disk 56.

In some examples, the press assembly 44 can include a ground-engaging tool 34 in the form of a press wheel 62 that can be positioned aft of the closing assembly 42 and can serve to pack soil on top of the deposited seeds. In some examples, the press wheel assembly 40 can include an arm 64 extending between the frame 36 and the press wheel 62.

The depth adjustment system 28 may include a press wheel actuator 66 that can be operably coupled to the arm 64 of the press wheel assembly 44 and configured to regulate a contact force between the press wheel 62 and the soil S. For example, in dry conditions, it may be desirable to firmly pack soil directly over the seeds to seal in moisture. In damp conditions, it may be desirable to leave the soil S over the seeds fairly loose in order to avoid compaction which may result in seed crusting. The process of excavating a trench into the soil S, depositing seeds within the trench, closing the trench, and packing soil on top of the seeds establishes a row of planted seeds within a field. By employing multiple row units 18 distributed along the toolbar 16, as shown in FIG. 3, multiple rows of seeds may be planted within the field.

In some examples, the row unit 18 can employ a residue manager assembly 46 to prepare the ground before seed deposition. As illustrated, the residue manager assembly 46 can include a ground-engaging tool 34, such as a wheel 68, coupled to the frame 36 by a linkage 70. The ground-engaging tool 34 can include tillage points or fingers 72 configured to break up crop residue on the soil surface. While a single residue manager ground-engaging tool 34 is shown in the illustrated example, it will be appreciated that the residue manager assembly 46 may include a pair of ground-engaging tools 34 angled toward one another. In addition, the residue manager assembly 46 may serve as a shock absorber to dissipate row unit bounce caused by contact with rocks or piles of residue, thereby protecting mechanical components of the row unit 18.

The depth adjustment system 28 can include a residue manager actuator 74 that can be configured to regulate a contact force between the ground-engaging tool 34 and the soil S. In some instances, the residue manager actuator 74 can extend from a residue manager bracket 76 to the linkage 70 of the residue manager assembly 46. The bracket 76 may be operably coupled with any component of the row unit 18, such as the frame 36, and/or any component of the implement 10, such as the toolbar 16.

In various instances, each of the downforce actuator 30, the opener control actuator 54, the closing disk actuator 60, the press wheel actuator 66, and/or the residue manager actuator 74 of the depth adjustment system 28 may be configured as a motor, a cylinder, and/or any other device that may be powered electrically, hydraulically, pneumatically, magnetically, thermally, and/or through any other manner.

With further reference to FIGS. 2 and 3, in some instances, the depth adjustment system 28 can further include a sensor system 78 having one or more sensors 80. The one or more sensors 80 may be operably coupled with the frame 36, a sensor bracket 82, and/or any other component of the row unit 18 or the implement 10. In some examples, the one or more sensors 80 may additionally or alternatively be positioned at any other suitable location(s) on and/or coupled to any other suitable component(s) of the implement 10 and/or the work vehicle. Each of the sensors 80 may have a field of view directed toward a predefined location as generally illustrated by dashed lines 84 in FIGS. 2 and 3.

In some instances, any of the one or more sensors 80 may be a soil sensor configured to capture data indicative of a soil characteristics, such as a soil moisture content, a degree of tillage applied to the soil S, an amount of residue cover, a soil composition, and/or any other characteristic, within the field. It will be appreciated that the soil sensor may generally correspond to any suitable sensing device configured to function as described herein. For example, in various embodiments, the soil sensor may include an emitter configured to emit an electromagnetic radiation signal, such as an ultraviolet radiation signal, a near-infrared radiation signal, a mid-infrared radiation signal, or a visible light signal for reflection off of the soil S. The soil sensor may also include a receiver configured to receive the reflected electromagnetic radiation signal. One or more spectral parameters (e.g., the amplitude, frequency, and/or the like) of the reflected electromagnetic radiation signal may, in turn, be indicative of the soil composition. In this regard, the emitter may be configured as a light-emitting diode (LEDs), or another electromagnetic radiation-emitting device and the receiver may be configured as a photoresistor or other electromagnetic radiation-receiving device. However, in alternative embodiments, the soil sensor may have any other suitable configuration and/or components.

Additionally or alternatively, any of the one or more sensors 80 may be configured as a depth sensor. It will be appreciated that the depth sensor may generally correspond to any suitable sensing device configured to function as described herein. For example, in various instances, the depth sensor may be configured as any device capable of determining a ground-engaging tool position relative to the soil S, such as a line scanner, a ground penetrating sensor (e.g., ground penetration radar unit), and/or any other practicable device. In some instances, the depth sensor may have a field of view that is at least partially aligned with the row unit 18 and/or laterally offset of the row units 18. In such instances, the depth sensor may capture data indicative of a first height $h_1$ of an on-row path of the row unit 18 (e.g., in the path of one or more ground-engaging tools 34 of the row unit 18) relative to a component of the implement 10, such as a base portion of the frame 36, and a second height $h_2$ of an off-set path of the row unit 18 (e.g., untouched, inter-row unit space that is generally not worked on by one or more ground-engaging tools 34 of the row unit 18) relative to the component of the implement 10, such as the base portion of the frame 36. Additionally or alternatively, the depth sensor may be operably coupled with the rotatable arm 50 of the opener assembly 40 and the frame 36, the arm 58 of the closing assembly 42, the arm 64 of the press wheel assembly 44 and the frame 36, and/or the linkage 70 of the residue manager assembly 46 and the frame 36 to determine rotational movement of the component relative to the frame 36. Based on the amount of rotation, the depth of the respective component may be determine. Additionally or alternatively, the depth sensor may be in the form of one or more pressure sensors and/or displacement sensors that are positioned within and/or operably coupled with the row unit actuator 30, the opener control actuator 54, the closing disk actuator 60, the press wheel actuator 66, and/or the residue manager actuator 74. The pressure sensor may be configured to determine the depth or a change in depth of the component and/or the row unit 18 based on the change in pressure within the row unit actuator 30, the opener control actuator 54, the closing disk actuator 60, the press wheel actuator 66, and/or the residue manager actuator 74. Additionally or alternatively, the displacement sensor may be configured to detect a change in position of a component (e.g., a piston, a rod, a defined tooth, etc.) of the row unit actuator 30, the opener control actuator 54, the closing disk actuator 60, the press wheel actuator 66, and/or the residue manager actuator 74 and determine the change in depth based on the change in displacement.

Figure 4:
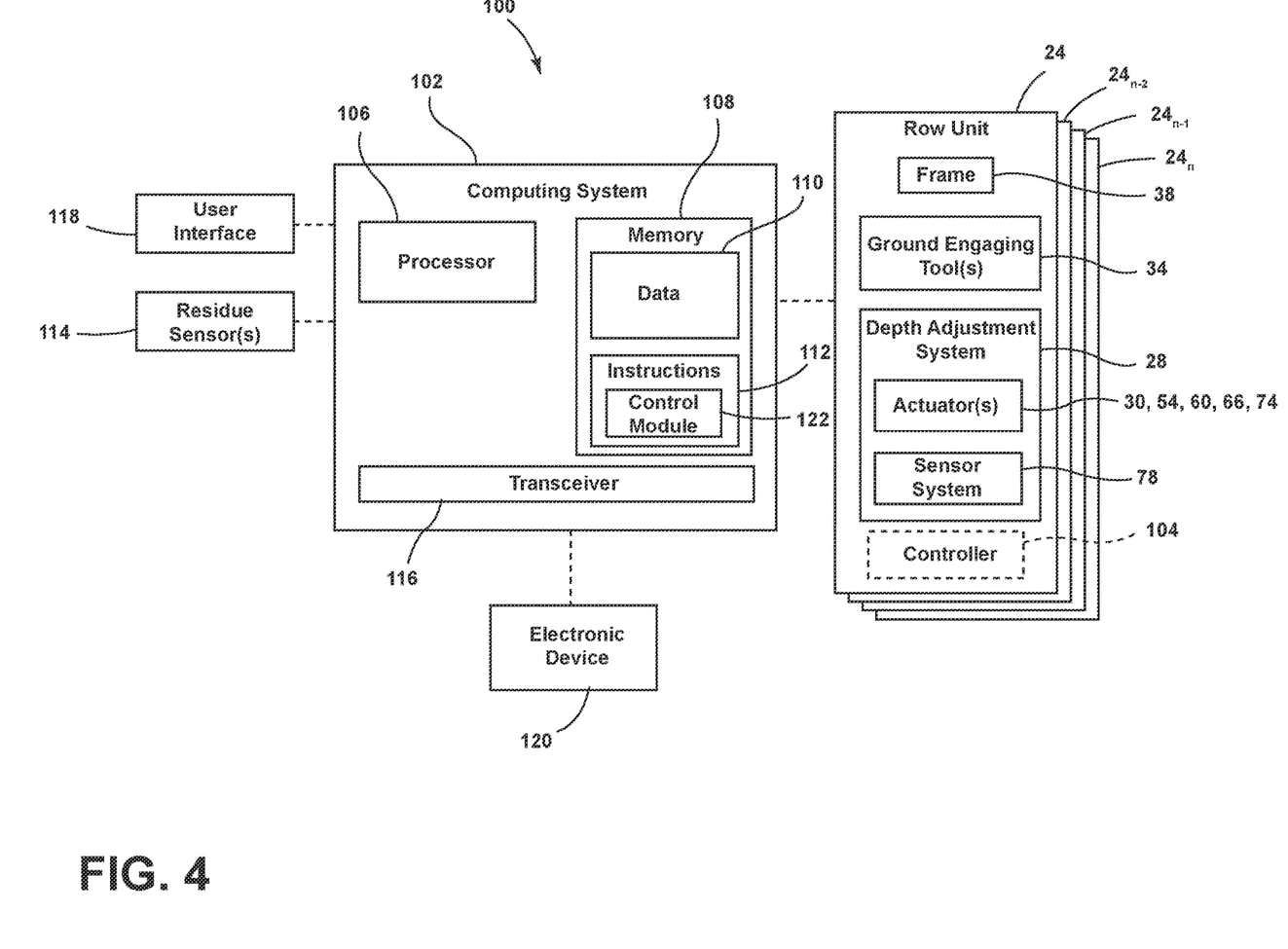
FIG. 4 is a schematic block diagram illustrating portions of the system of FIG. 3 in accordance with aspects of the present subject matter.

Referring now to FIG. 4, a block view of a system 100 for operating various agricultural implements is illustrated in accordance with aspects of the present subject matter. In general, the system 100 will be described herein with reference to the planting implement 10 and the row unit 18 described above with reference to FIGS. 1-3. However, it will be appreciated that the disclosed system 100 may generally be utilized with any planter or seeder having any suitable implement configuration, with row units 18 having any suitable row unit configuration, with seed meters having any suitable meter configuration, and/or with seed transport members have any suitable transport member configuration. For purposes of illustration, communicative links, or electrical couplings, of the system 100 shown in FIG. 4 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). In various examples, the wireless communication networks can include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In several examples, the system 100 may include a computing system 102 and various other components configured to be communicatively coupled to and/or controlled by the computing system 102, such as one or more row units 18 and a respective depth adjustment system 28 operably coupled with each row unit 18. Accordingly, while one row unit 18 and depth adjustment system 28 is illustrated in FIG. 4, it will be appreciated that the planting implement 10 may include any number of row units 18, $18_{n-2}$, $18_{n-1}$, $18_n$ without departing from the scope of the present disclosure.

The computing system 102 may be communicatively coupled to one or more actuators, such as the row unit actuator 30, the opener control actuator 54, the closing disk actuator 60, the press wheel actuator 66, and/or the residue manager actuator 74, of the one or more row units 18, $18_{n-2}$, $18_{n-1}$, $18_n$. The computing system 102 may further be communicatively coupled with the sensor system. Based on the data received from the sensor system 78, the computing system 102 can be configured to determine a probability of a penetration variation of a ground-engaging tool 34 relative to a respective defined depth range based on the soil characteristic. In some instances, the probability of a penetration variation of the ground-engaging tool 34 relative to the respective depth range may be based on the soil characteristic may be determined based on the detected soil characteristics. Additionally or alternatively, the probability of a penetration variation of the ground-engaging tool 34 relative to the respective depth range may be based on a difference between the detected height of the row unit 18, as calculated based on the first height and the second height, and the defined depth range.

In some instances, the computing system 102 may activate one or more of the actuators to alter a first position of a ground-engaging tool 34 to a second position of the ground-engaging tool 34 when the probability of variation exceeds a defined threshold and/or the detected depth deviates from the defined depth range. In some instances, the data captured by the sensor system 78 may be used to determine the corrective action. For instance, the second position can be at least partially based on the probability of a penetration variation and/or the difference between the detected height of the row unit 18, as calculated based on the first height and the second height, and the defined depth range. The defined depth may be a discrete depth and/or a range of depths that includes the discrete depth plus or minus a defined amount.

In general, the computing system 102 can include any suitable processor-based device, such as a computing device or any suitable combination of computing devices. Thus, in several embodiments, the computing system 102 may include one or more processors 106 and associated memory 108 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 108 of the computing system 102 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 108 may generally be configured to store information accessible to the processor 106, including data 110 that can be retrieved, manipulated, created, and/or stored by the processor 106 and instructions 112 that can be executed by the processor 106 and configure the computing system 102 to perform various computer-implemented functions, such as one or more algorithms and/or related methods. In addition, the computing system 102 may also include various other suitable components, such as a communications circuit or module, one or more input/output channels, a data/control bus, and/or the like.

In several embodiments, the data 110 may be stored in one or more databases. The data 110 may be associated with the operation of the row unit 18, which may be received by the sensor system 78. Additionally or alternatively, the data 110 may be associated with a positioning system 114. In some examples, the positioning system 114 may be configured to determine the location of the implement 10 and/or the row unit 18 by using a satellite navigation positioning system (e.g. a global positioning system (GPS), a Galileo positioning system, the Global Navigation satellite system (GLONASS), the BeiDou Satellite Navigation and Positioning system, a dead reckoning device, and/or any other practicable device). In such embodiments, the location determined by the positioning system 114 may be transmitted to the computing system 102 (e.g., in the form of location coordinates) and stored within as data 110 for subsequent processing and/or analysis.

In several embodiments, the instructions 112 stored within the memory 108 of the computing system 102 may be executed by the processor(s) 106 to implement a control module 122. In general, the control module 122 may be configured to sample and/or evaluate the data 110 and/or other inputs received by the computing system 102. In various examples, the control module 122 may be configured to sample and/or evaluate the data from one or more of the sensors 80 described herein continuously, periodically, or as demanded. Based on the data, the control module 122 may determine a probability of a penetration variation of one or more ground-engaging tools 34 varying from respective thresholds for each of the ground-engaging tools 34 through the use of one or more algorithms or other methods. For instance, when running the implement 10 in wetter soils, the row unit 18 can unintentionally push deeper into the soil than the defined depth and/or the defined depth range. As such, the data provided by the one or more sensors 80 may be used to determine whether a probability of over-penetration of the row unit 18 exceeds a probability threshold. If the probability exceeds the threshold, the control module 122 may perform one or more control actions. For instance, the control module 122 may provide a notification to a user interface 118 and/or an electronic device 120.

Additionally or alternatively, the control module 122 may provide instructions to alter, activate, or manipulate the depth adjustment system 28. The computing system 102 may receive data indicative of a first height $h_1$ (FIG. 3) of an on-row path of the row unit 18 (e.g., in the path of one or more ground-engaging tools 34 of the row unit 18) relative to a component of the implement 10, such as a base portion of the frame 36, and a second height $h_2$ (FIG. 3) of an off-set path of the row unit 18 (e.g., untouched, inter-row unit space that is generally not worked on by one or more ground-engaging tools 34 of the row unit 18) relative to the component of the implement 10, such as the base portion of the frame 36. In some instances, the probability of a penetration variation of the ground-engaging tool 34 relative to the respective depth range may be based on a difference between the detected height of the row unit 18, as calculated based on the first height and the second height, and the defined depth range.

Additional data may be provided to the computing system 102 (or the controller 104 of the depth adjustment system 28) after the alteration or manipulation of the depth adjustment system 28, which can lead to subsequent alterations or manipulations to maintain a detected position of a ground-engaging tool 34 (or another component) of the row unit 18 within a defined tool depth and/or within a defined tool depth range. For instance, the one or more algorithms or methods utilized to generate the probability of deviation for each of the ground-engaging tools 34, and/or the row unit 18 as a whole, may be updated based on previous corrective actions allowing for the system to learn from previous actions allowing for closed-loop control of one or more row units 18, $18_{n-2}$, $18_{n-1}$, $18_n$ by the control module 122. Additionally or alternatively, the system 100 may allow for closed-loop control of each row unit 18, $18_{n-2}$, $18_{n-1}$, $18_n$ by the controller 104 of each row unit 18, $18_{n-2}$, $18_{n-1}$, $18_n$ for the inputted defined tool depth and/or within the defined tool depth range of the ground-engaging tool 34 of each row unit 18, $18_{n-2}$, $18_{n-1}$, $18_n$.

In various examples, the system 100 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 102 and/or each controller 104 and may be used to generate a predictive evaluation of the alterations to the one or more actuators, such as the row unit actuator 30, the opener control actuator 54, the closing disk actuator 60, the press wheel actuator 66, and/or the residue manager actuator 74. For instance, the control module 122 may alter the one or more actuators 30, 54, 60, 66, 74. In turn, the sensor system 78 may monitor the corresponding ground-engaging tool position changes and/or residue changes. Each change may be fed back into the control module 122 and/or the controller 104 for each row unit 18, 18n for further alterations to the one or more actuators 30, 54, 60, 66, 74.

Moreover, as shown in FIG. 4, the user interface 118 may communicate with the computing system 102 through a transceiver 116. In some cases, the user interface 118 may be configured to provide feedback to the operator of the planting implement 10. As such, the user interface 118 may include one or more feedback devices, such as display screens, speakers, warning lights, and/or any other practicable device, which are configured to communicate such feedback. In addition, some examples of the user interface 118 may include one or more input devices, such as touchscreens, keypads, touchpads, knobs, buttons, sliders, switches, mice, microphones, and/or any other practicable device, which are configured to receive user inputs from the operator. In various examples, user inputs may include a defined tool depth and/or a tool depth range for a ground-engaging tool 34 (or another component) of the row unit 18. In various examples, the user interface 118 may be positioned within a cab of a work vehicle configured to tow the planting implement 10 across the field. However, in alternative embodiments, the user interface 118 may have any suitable configuration and/or be positioned in any other suitable location.

Further, the computing system 102 may also communicate via wired and/or wireless communication with one or more remote electronic devices 120 through the transceiver 116. The electronic device 120 may include a display for displaying information to a user. For instance, the electronic device 120 may display one or more user interfaces and may be capable of receiving remote user inputs to set a predefined threshold for any of the operating parameters and/or to input any other information. In addition, the electronic device 120 may provide feedback information, such as visual, audible, and tactile alerts, and/or allow the user to provide one or more inputs through the usage of the remote electronic device 120, which may be a defined tool depth and/or a defined tool depth range for a ground-engaging tool 34 (or another component) of the residue manager assembly 46. It will be appreciated that the electronic device 120 may be any one of a variety of computing devices and may include a processor and memory. For example, the electronic device 120 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Additionally or alternatively, a defined tool depth and/or a defined tool depth range for a ground-engaging tool 34 (or another component) of the row unit 18 may be found or selected in any other suitable way, such as from a predetermined look-up table stored in the computing system 102 and/or one or more controllers 104. In some instances, the look-up tables may be based on the agricultural product being deposited within the field and/or an application map that is stored within the computing system 102.

It will be appreciated that, in general, the computing system 102 of the disclosed system 100 may correspond to any suitable computing device(s) that can be configured to function as described herein. In several embodiments, the computing system 102 may form part of an active planting system configured to perform a planting operation, such as by corresponding to a vehicle controller of a work vehicle configured to tow an associated planting implement 10 and/or an associated implement controller of the planting implement 10. Alternatively, the computing system 102 can include a separate computing device(s) configured to be used primarily for the purpose of performing the various calibration methods and/or routines described herein.

It will additionally be appreciated that the computing system 102 may correspond to an existing controller of the planting implement 10 or an associated work vehicle or the computing system 102 may correspond to a separate processing device. For instance, in some cases, the computing system 102 may form all or part of a separate plug-in module that may be installed within the planting implement 10 or associated work vehicle to allow for the disclosed system and method to be implemented without requiring additional software to be uploaded onto existing control devices of the planting implement 10 or the associated work vehicle.

Figure 5:
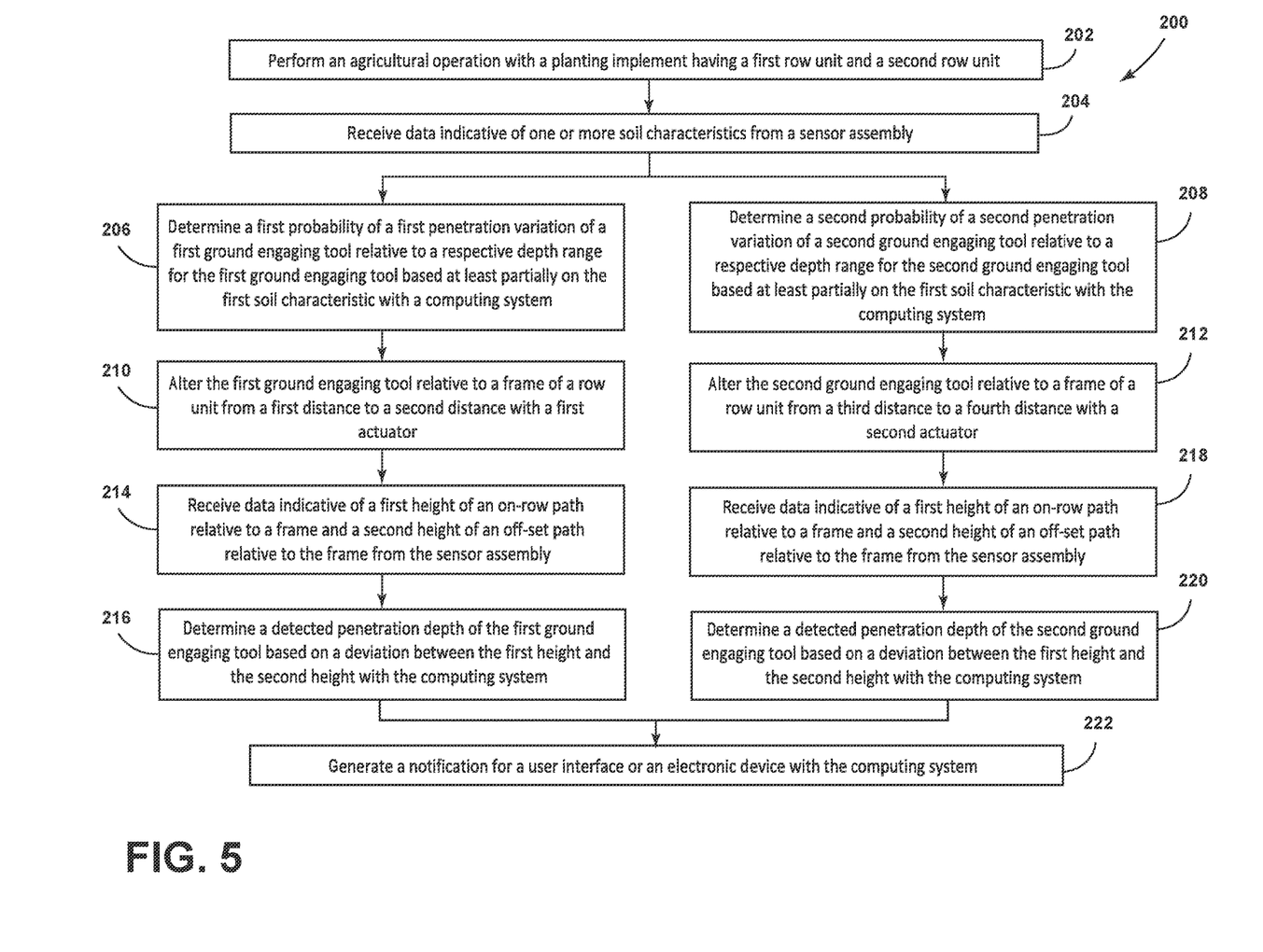
FIG. 5 illustrates a flow diagram of a method for an agricultural operation in accordance with aspects of the present subject matter.

Referring now to FIG. 5, a flow diagram of some examples of a method 200 for an agricultural operation is illustrated in accordance with aspects of the present subject matter. In general, the method 200 will be described herein with reference to the planting implement 10 and one or more row units 18 described above with reference to FIGS. 1-4. However, the disclosed method 200 may generally be utilized with any suitable vehicle and/or implement. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 5, at (202), the method 200 can include performing an agricultural operation with a planting implement having a first row unit and a second row unit. Each row unit can include one or more ground-engaging tools that may be configured to form a furrow having a desired depth within the soil of a field. Thereafter, each row unit may deposit an agricultural product, such as seeds and/or a fertilizer, within the corresponding furrow and subsequently close the corresponding furrow with one or more ground-engaging tools after the agricultural product has been deposited.

At (204), the method 200 can include receiving data indicative of one or more soil characteristics from a sensor system. In various examples, the one or more soil characteristics may include a soil moisture content (i.e., percent water by volume of soil makeup), a degree of tillage applied to the soil S, an amount of residue cover, a soil composition, and/or any other characteristic.

At (206), the method 200 can include determining a first probability of a first penetration variation of a first ground-engaging tool relative to a respective depth range for the first ground-engaging tool based at least partially on the first soil characteristic with a computing system. Similarly, at (208), the method can include determining a second probability of a second penetration variation of a second ground-engaging tool relative to a respective depth range for the second ground-engaging tool based at least partially on the first soil characteristic with the computing system. Based on variations in the soil, the probability of the first or second ground-engaging tools deviating from the defined depth range may change. For instance, when running the implement in wetter soils, the row unit can unintentionally push deeper into the soil than the defined depth and/or the defined depth range. As such, when the probability of a penetration variation exceeds a threshold (such as 50%), the method may perform one or more control actions.

For example, at (210), the method 200 can include altering the first ground-engaging tool relative to a frame of a row unit from a first distance to a second distance with a first actuator. Similarly, at (212), the method can include altering the second ground-engaging tool relative to a frame of a row unit from a third distance to a fourth distance with a second actuator. In various examples, the second distance is based at least partially on the detected first penetration depth and the first defined depth range and the fourth distance is based at least partially on the detected second penetration depth and the second defined depth range. In some cases, a first change from the first distance to the second distance is varied from a second change between the third distance and the fourth distance.

At (214), the method 200 can include receiving data indicative of a first height of an on-row path relative to a frame and a second height of an off-set path relative to the frame from the sensor system. In turn, at (216), the method 200 can include determining a detected penetration depth of the first ground-engaging tool based on a deviation between the first height and the second height with the computing system. In some instances, the deviation may be compared to the defined depth range of the first ground-engaging tool to determine an error offset, which may be associated with variations in the soil characteristics. Additionally or alternatively, the method may include monitoring a detected change in height based on the first height and the second height relative to an instructed height change to determine the effect of the soil characteristics on the actual height change to determine a projected error offset. The error offset may be used in subsequent alterations of the first actuator when similar soil characteristics are detected.

At (218), the method can include receiving data indicative of a third height of an on-row path relative to a frame and a fourth height of an off-set path relative to the frame from the sensor system. In turn, at (220), the method 200 can include determining a detected penetration depth of the second ground-engaging tool based on a deviation between the third height and the fourth height with the computing system. In some instances, the deviation may be compared to the defined depth range of the second ground-engaging tool to determine an error offset, which may be associated with variations in the soil characteristics. Additionally or alternatively, the method may include monitoring a detected change in height based on the third height and the fourth height relative to an instructed height change to determine the effect of the soil characteristics on the actual height change to determine a projected error offset. The error offset may be used in subsequent alterations of the second actuator when similar soil characteristics are detected.

At (222), the method can include generate a notification for a user interface or an electronic device with the computing system when the probability of a first penetration variation of the first ground engaging exceeds a first threshold and/or the probability of a second penetration variation of the second ground engaging exceeds a second threshold, which may be the same or different than the first threshold.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the position of the ground-engaging tool and/or any other component of the residue manager assembly. In some instances, the vehicle learning engine may allow for changes to the position of the ground-engaging tool and/or any other component of the residue manager assembly to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for a row unit of a planting implement, the system comprising:
   a frame operably coupled with a toolbar;
   one or more ground-engaging tools operably coupled with the frame;
   a depth adjustment system comprising:
      an actuator; and
      a sensor system configured to capture data indicative of a soil characteristic, the sensor system further configured to capture data indicative of a first height of an on-row path relative to the frame and a second height of an off-set path relative to a common point on the frame; and
   a computing system communicatively coupled to the one or more actuators and the sensor system, the computing system being configured to:
      receive the data indicative of the soil characteristic;
      determine a probability of a penetration variation of the one or more ground-engaging tools relative to a respective defined depth range for each of the one or more ground-engaging tools based on a difference between a detected height and the defined depth range, wherein the detected height is based on the first height and the second height; and
      perform a control action based at least in part on the probability deviating from a defined threshold.

2. The system of claim 1, wherein the control action is generating a notification that is provided to at least one of a user interface or an electronic device.

3. The system of claim 1, wherein the control action is instructions to activate the actuator of the depth adjustment system.

4. The system of claim 3, further comprising:
   a controller operably coupled with the actuator and the computing system, wherein the computing system activates the actuator by providing instructions to the controller and the controller manipulates the actuator based on the instructions provided by the computing system.

5. The system of claim 4, wherein the soil characteristic is a soil moisture content within a soil.

6. The system of claim 4, wherein the computing system is further configured to determine a detected penetration depth based on a deviation between the first height and the second height.

7. The system of claim 6, wherein the activation of the one or more actuators alters a position of the one or more ground-engaging tools relative to the toolbar between a first position and a second position, and wherein the second position is based at least partially on the detected penetration depth and the defined depth range.

8. The system of claim 7, wherein the second position is based at least partially on the soil characteristic.

9. A method for an agricultural operation, the method comprising:
   receiving, from a sensor system remote from one or more ground-engaging tools, data indicative of a first soil characteristic;
   receiving, from the sensor system, data indicative of a first height of an on-row path relative to a frame and a second height of an off-set path relative to the frame, the one or more ground-engaging tools operably coupled with the frame;
   determining, with a computing system, a first probability of a first penetration variation of a first ground-engaging tool relative to a respective depth range for the first ground-engaging tool based on a difference between a detected height and a defined depth range, wherein the detected height is based on the first height and the second height; and performing a control action based at least in part on the probability deviating from a defined threshold.

10. The method of claim 9, further comprising:

altering, with a first actuator, the first ground-engaging tool relative to a frame of a row unit from a first distance to a second distance based at least partially on the first soil characteristic.

11. The method of claim 10, further comprising:

determining, with the computing system, a second probability of a second penetration variation of a second ground-engaging tool relative to a respective defined depth range for the second ground-engaging tool based at least partially on the first soil characteristic.

12. The method of claim 11, further comprising:

altering, with a second actuator, the second ground-engaging tool relative to a frame of a row unit from a third distance to a fourth distance based at least partially on the second soil characteristic.

13. The method of claim 12, wherein a first change from the first distance to the second distance is varied from a second change between the third distance and the fourth distance.

14. The method of claim 9, wherein the method further comprises:

determining, with the computing system, a detected penetration depth of the first ground-engaging tool based on a deviation between the first height and the second height, wherein the second height is based at least partially on the detected first penetration depth and the first defined depth range.

15. The method of claim 9, further comprising:

generating, with the computing system, a notification for a user interface.

16. A system for a row unit of a planting implement, the system comprising:

a frame operably coupled with a toolbar;

a ground-engaging tool operably coupled with the frame;

an actuator operably coupled with the frame and the ground-engaging tool;

a sensor system configured to capture data indicative of a first height of an on-row path relative to the frame and a second height of an off-set path relative to the frame; and a computing system communicatively coupled to the actuator and the sensor system, the computing system being configured to:

receive the data indicative of the first height and the second height;

determine a detected depth of the ground-engaging tool based on a difference between the first height and the second height;

compare the detected depth to a defined depth range; and activate the actuator to alter a first position of the ground-engaging tool to a second position of the ground-engaging tool when the detected depth deviates from the defined depth range.

17. The system of claim 16, wherein the sensor system is further configured to capture data indicative of a soil characteristic.

18. The system of claim 17, wherein the computing system is further configured to:

determine a probability of a penetration variation of the ground-engaging tool relative to the respective depth range based on the soil characteristic.

19. The system of claim 18, wherein the second position is at least partially based on the probability of the penetration variation.

* * * * *